(12) United States Patent
Niles

(10) Patent No.: US 7,721,459 B2
(45) Date of Patent: May 25, 2010

(54) HOT STICK WITH MEASURING CALIPERS

(75) Inventor: Martin S. Niles, Stony Plain (CA)

(73) Assignee: Cantega Technologies Inc., Edmonton, Alberta (CA)

( * ) Notice: Subject to any disclaimer, the term of this patent is extended or adjusted under 35 U.S.C. 154(b) by 0 days.

(21) Appl. No.: 12/039,499

(22) Filed: Feb. 28, 2008

(65) Prior Publication Data

US 2009/0217544 A1 Sep. 3, 2009

(51) Int. Cl.
*G01B 5/14* (2006.01)
(52) U.S. Cl. .......................... 33/811; 33/700; 294/19.1; 81/53.1
(58) Field of Classification Search ............ 33/700, 33/716, 784, 813, 819, 811; 140/106, 113; 324/106; 29/758; 294/19.1; 81/53.1, 53.11, 81/53.12
See application file for complete search history.

(56) References Cited

U.S. PATENT DOCUMENTS

| | | | | |
|---|---|---|---|---|
| 1,066,273 | A | | 7/1913 | Heintzelman |
| 2,941,367 | A | * | 6/1960 | Schwab ................... 92/130 R |
| 3,017,905 | A | * | 1/1962 | Klein ........................ 140/113 |
| 3,193,765 | A | * | 7/1965 | Bevins ....................... 324/149 |
| 3,637,034 | A | * | 1/1972 | Wickenberg ................ 177/208 |
| 3,682,196 | A | * | 8/1972 | Kosui et al. ................. 137/553 |
| 3,836,852 | A | * | 9/1974 | Ross ...................... 324/123 R |
| 3,868,136 | A | * | 2/1975 | Schweitzer, Jr. ........... 294/19.1 |
| 3,995,373 | A | | 12/1976 | Brumbelow |
| 4,459,702 | A | * | 7/1984 | Medwin ...................... 377/24 |
| 4,536,960 | A | | 8/1985 | Muti |
| 4,897,931 | A | | 2/1990 | Goulette |
| 4,965,930 | A | * | 10/1990 | Wnukowski ................. 29/758 |
| 5,075,620 | A | * | 12/1991 | Shaw ........................ 324/122 |
| 5,136,234 | A | * | 8/1992 | Shaw .......................... 324/72 |
| 5,140,257 | A | * | 8/1992 | Davis ........................ 324/106 |
| 5,313,715 | A | | 5/1994 | Wang |
| 5,341,088 | A | * | 8/1994 | Davis ........................ 324/106 |
| 5,574,381 | A | | 11/1996 | Andermo et al. |
| 5,735,058 | A | | 4/1998 | Jimenez |

(Continued)

OTHER PUBLICATIONS

"Salisbury Hot Sticks & Tools", Salisbury by Honeywell [online], Feb. 2006, http://www.whsalisbury.com, Skokie, IL.

(Continued)

*Primary Examiner*—G. Bradley Bennett
*Assistant Examiner*—Tania C Courson
(74) *Attorney, Agent, or Firm*—Anthony R. Lambert

(57) ABSTRACT

There is a hot stick with measuring calipers. The hot stick has a hot stick stock and a hot stick driving bar. Movement of the hot stick driving bar controls the movement of fixed and movable jaw portions of internal and external caliper measurement jaws. In operation a dimension measuring element displays a distance between the fixed and movable jaw portions of the internal and external caliper measuring jaws. A hand grip allows an operator to move the hot stick driving bar relative to the hot stick driving bar. The hot stick stock and the hot stick driving bar both at least partially made of a dielectric material to allow measurements of at least one component of electrical power transmission equipment. The measurements may then be used to modify the electrical power transmission equipment.

13 Claims, 3 Drawing Sheets

U.S. PATENT DOCUMENTS

| | | |
|---|---|---|
| 5,983,515 A | 11/1999 | Brinker et al. |
| 6,459,252 B1 * | 10/2002 | Bierer ........................ 324/72.5 |
| 6,734,658 B1 * | 5/2004 | Bierer ........................ 324/115 |
| 2007/0014108 A1 * | 1/2007 | Uke ........................... 362/191 |

OTHER PUBLICATIONS

"Salisbury Outage Protection", Salisbury by Honeywell [online], Feb. 2006, http://www.whsalisbury.com, Skokie, IL.

* cited by examiner

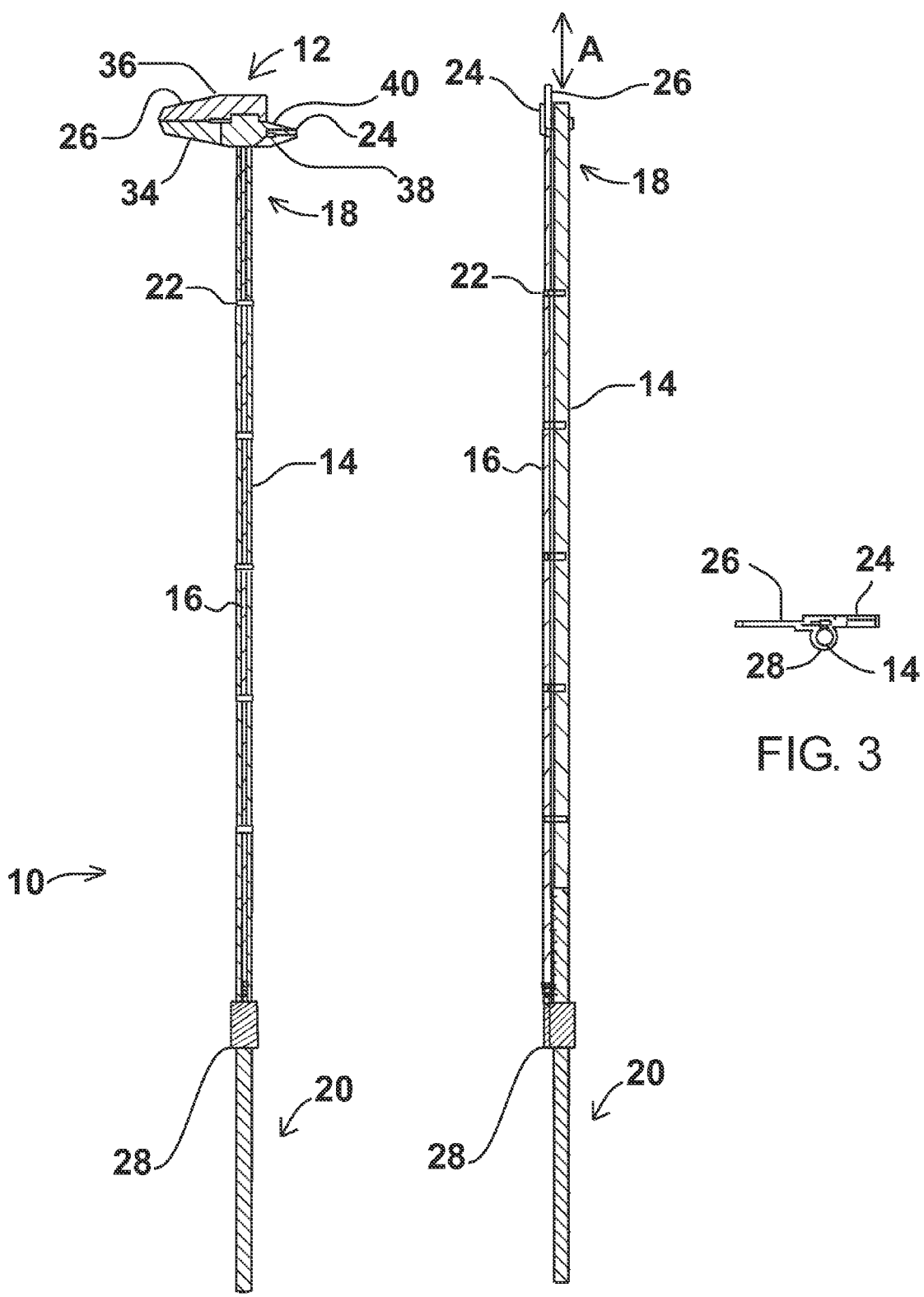

HOT STICK WITH MEASURING CALIPERS

BACKGROUND

This patent document relates generally to hot stick measurement tools and in particular to calipers.

There is a need for calipers that may safely measure distances in locations where there are live electrical currents, such as electrical power transmission equipment. Additionally, calipers used to measure distances between features of electrical power transmission equipment must also allow for measurements at a distance from an operator of the calipers.

SUMMARY

These and other needs are addressed in this patent document.

In an embodiment there is a hot stick, comprising a hot stick stock made at least in part of a dielectric material. A caliper is at a measuring end of the hot stick stock. A distance measuring element is at an end of the hot stick stock opposed to the measuring end, the distance measuring element being operably connected to the caliper to indicate distance measured by the caliper.

These and other aspects of the device and method are set out in the claims, which are incorporated here by reference.

BRIEF DESCRIPTION OF THE FIGURES

Embodiments will now be described with reference to the figures, in which like reference characters denote like elements, by way of example, and in which:

FIG. 1 is a side view of an embodiment of a hot stick with measuring calipers;

FIG. 2 is second side view of the hot stick of FIG. 1;

FIG. 3 is a top view of the hot stick of FIG. 1;

DETAILED DESCRIPTION

In the claims, the word "comprising" is used in its inclusive sense and does not exclude other elements being present. The indefinite article "a" before a claim feature does not exclude more than one of the feature being present. Each one of the individual features described here may be used in one or more embodiments and is not, by virtue only of being described here, to be construed as essential to all embodiments as defined by the claims.

Figure 4:
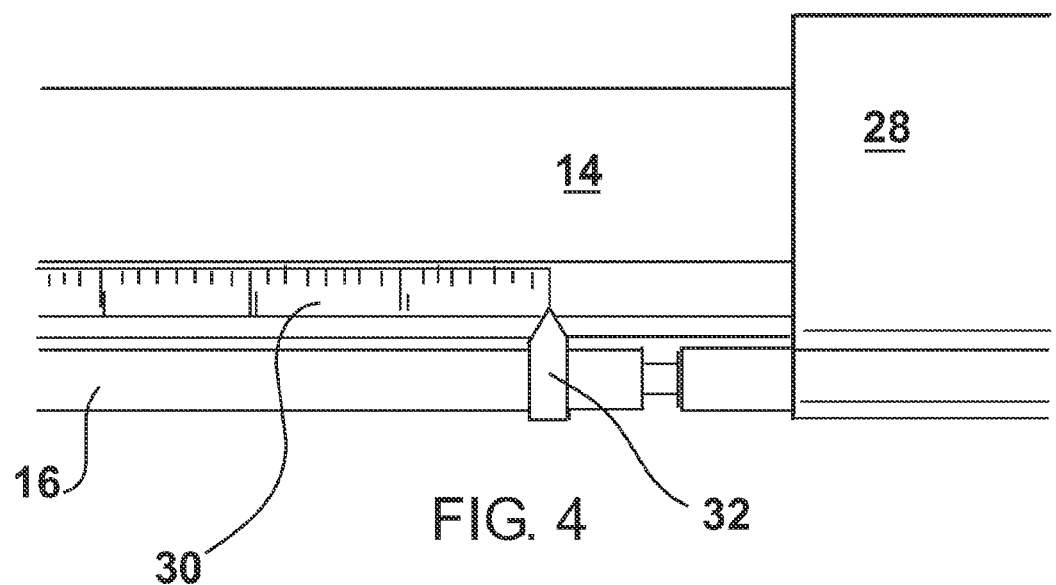
FIG. 4 is a side view of a supporting end of the hot stick of FIG. 1.
Figure 5:
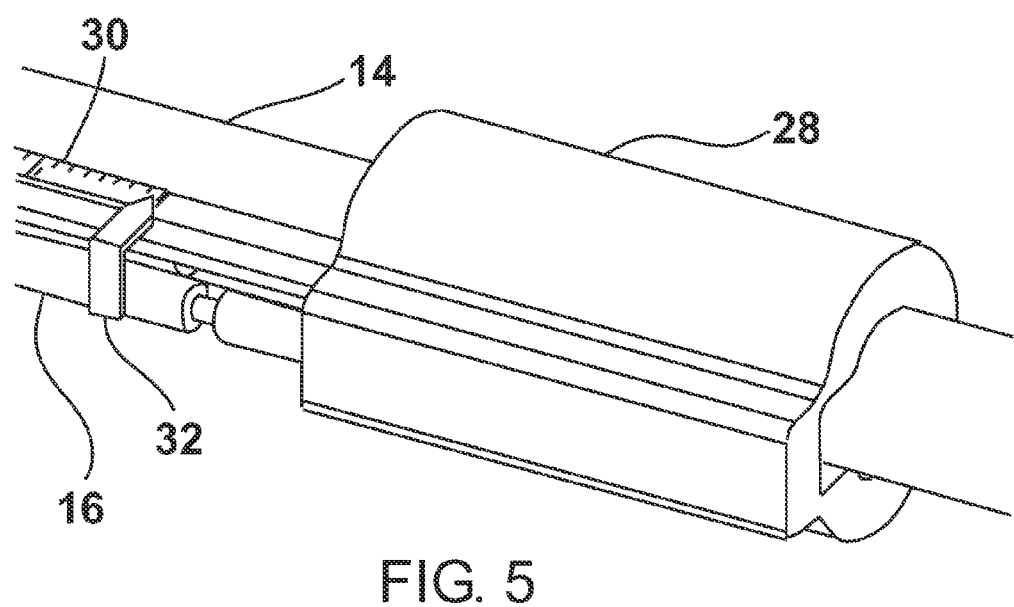
FIG. 5 is a perspective view of the supporting end of the hot stick of FIG. 1.

In FIGS. 1-3, there is shown a hot stick 10 with measuring calipers 12. The hot stick stock 14 defines a longitudinal axis as shown by the axis A in FIG. 2. A hot stick driving bar 16 lies adjacent to the hot stick stock 14. The hot stick driving bar 16 is movable relative to the hot stick stock 14 parallel to the longitudinal axis of the hot stick stock 14. The hot stick stock 14 and the hot stick driving bar 16 each have a measuring end 18 and a supporting end 20, which is opposed to the measuring end 18. A plurality of clamps 22 slidably attach the hot stick stock 14 to the hot stick driving bar 16. An internal caliper measurement jaw 24 has a movable jaw portion 38 and a fixed jaw portion 40. An external caliper measurement jaw 26 has a movable jaw portion 34 and a fixed jaw portion 36. The fixed jaw portions 40 and 36 are fixed to the hot stick stock 14. The movable jaw portions 34 and 38 are driven by the hot stick driving bar 16. A dimension measuring element, for example the measuring scale 30 and measuring needle 32 of FIGS. 4 and 5, is on the hot stick stock 14 and the hot stick driving bar 16 to indicate the relative movement between the hot stick stock 14 and the hot stick driving bar 16. The hot stick stock 14 and the hot stick driving bar 16 are at least partially made of a dielectric material. The construction of hot stick stock 14 and dielectric material should meet regulatory requirements and should have a length sufficient to provide limit of approach protection for high voltage power equipment energized at more than 750 V.

A hand grip 28 attaches at or near the supporting ends 20 of the hot stick stock 14 and the hot stick driving bar 16. The hand grip 28 is secured to the hot stick driving bar 16. The hand grip 28 is slidably connected to the hot stick stock 14. The movable jaw portions 34 and 38 may be connected to form a single movable jaw piece. The fixed jaw portions 36 and 40 may be connected to form a single fixed jaw piece.

In FIGS. 4 and 5, there is shown a more detailed view of the supporting end 20 (FIG. 1) of the hot stick stock 14 and hot stick driving bar 16. A measuring scale 30 is attached to the hot stick stock 14 to record relative movement between the hot stick stock 14 and the hot stick driving bar 16. A measuring needle 32 is attached to the hot stick driving bar 16 to provide a visual reading of movement of the fixed 40, 36 and movable 38, 34 jaw portions of the internal and external caliper measurement jaws 24, 26. The measuring scale 30 and the measuring needle 32 together constitute a dimension measuring element to record the relative movement between the hot stick stock 14 and the hot stick driving bar 16. In some embodiments, the distance between the fixed 40, 36 and movable 38, 34 jaw portions may be determined by other measurement systems, for example by optical or laser measurement. The distance may be determined directly or indirectly. In other embodiments, the measurement may be calculated by a measurement device and sent to a remote computer device, for example a handheld device.

Figure 6:
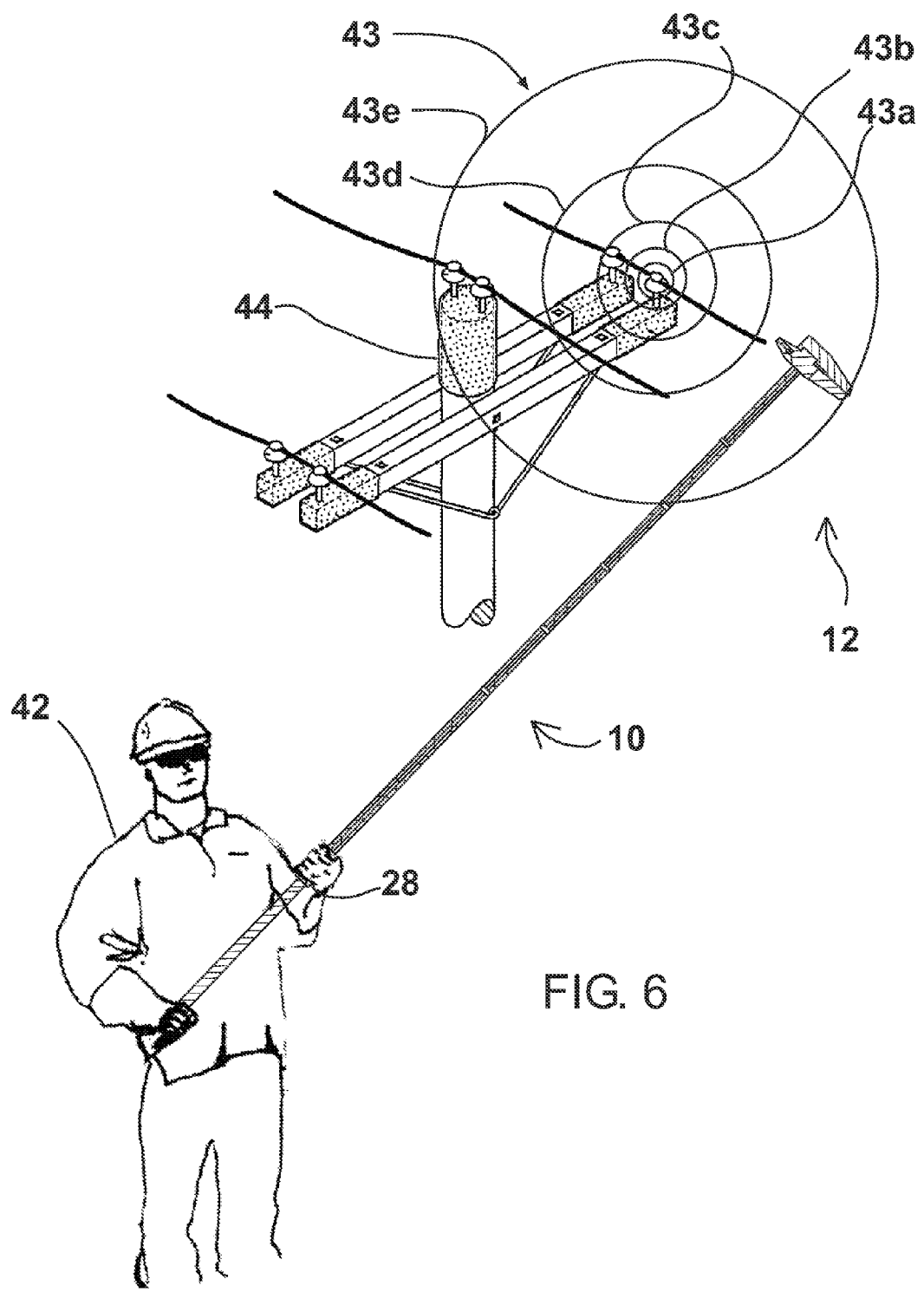
FIG. 6 is a perspective view, not to scale, of an operator using the hot stick of FIG. 1.

In FIG. 6, there is shown an operator 42 who operates the hot stick 10. The operator 42 holds the hot stick 10 with a hand on the hand grip 28. The hot stick 10 can be used to measure a distance between features of at least one component of the electrical power transmission equipment such as the components of an overhead power line 44. Hotstick 10 allows a user to take measurements of components from a position outside the safe limits of approach 43. Standard limits of approach are generally set by the IEEE for live electrical systems. It should be understood that the limits of approach may vary according to region. The limits of approach 43 around energized equipment generally widens as the voltage increases. In the illustration of FIG. 6, the limits of approach 43 correspond to increasing voltages, and thus increasing radii, from limits of approach 43a-43e. Hotstick 10 may be provided in a length that is suitable for the various limits of approach standards in all jurisdictions. After measurements are obtained by the operator 42 then the measurement may be used to modify the electrical power transmission equipment, such as by determining an appropriate type installation cover, as in known in the prior art and needs not be described here, and installing the installation cover on the overhead power line 44.

In operation, movement of the hand grip 28 towards the measuring end 18 of the hot stick stock 14 moves the hot stick driving bar 16 toward the measuring end 18 of the hot stick stock 14. The hand grip 28 provides a simple and easy to use way of moving the hot stick driving bar 16 relative to the hot stick stock 14. Movement of the hot stick driving bar 16 causes the movable jaw portions 34 and 38 of the external and internal caliper measurement jaws 26 and 24 to move away from the fixed jaw portions 36 and 40. The distance between the movable jaw portions 38 and 34 and the fixed jaw portions 36 and 40 is recorded by the relative movements of the hot stick stock 14 and the hot stick driving bar 16. The measuring needle 32 and measuring scale 30 indicate the distance between the movable jaw portions 34 and 38 and the fixed jaw portions 36 and 40. The operator 42 may use the hot stick 10 to measure electrical power transmission equipment, including overhead power lines 44.

In another embodiment a digital dimension measuring element may replace the measuring needle 32 and measuring scale 30 of the embodiment of FIG. 1. The digital dimension measuring element may output onto a display the recorded relative movement of the hot stick stock 14 and the hot stick driving bar 16.

The dielectric material which constitutes at least a part of the hot stick stock 14 and the hot stick driving bar 16 can comprise a single part material or multiple part material mixed before application, and can be formulated from a combination of liquid and semi-solid or solid components. Electrical power transmission equipment may refer to any apparatus intended to transmit power. It will be understood that the teachings equally apply and may be adapted to any commercially used voltage range or any suitable transmission system. In another embodiment the hot stick driving shaft may be replaced with a different driving system, such as a pulley system.

Hot stick 10 may be separated into more than one part, for ease of transport. For example, hot stick 10 may collapse into three parts. For further example, hot stick 10 may be provided as a multi-part kit.

Immaterial modifications may be made to the embodiments described here without departing from what is covered by the claims.

What is claimed is:

1. A hot stick, comprising:
    a hot stick stock made at least in part of a dielectric material;
    a caliper at a measuring end of the hot stick stock; and
    a distance measuring element at an end of the hot stick stock opposed to the measuring end, the distance measuring element being operably connected to the caliper to indicate distance measured by the caliper.

2. The hot stick of claim 1 in which the hot stick stock defines a longitudinal axis and further comprising:
    a hot stick driving bar lying adjacent to the hot stick stock, the hot stick driving bar being movable relative to the hot stick stock parallel to the longitudinal axis of the hot stick stock.

3. The hot stick of claim 2 further comprising a plurality of clamps slidably connecting the hot stick stock to the hot stick driving bar.

4. The hot stick of claim 2 in which the caliper further comprises:
    a caliper measurement jaw having a movable jaw portion; and
    a fixed jaw portion, the fixed jaw portion being fixed to the hot stick stock and the movable jaw portion being driven by the hot stick driving bar.

5. The hot stick of claim 4 in which the caliper measurement jaw is an external caliper measurement jaw.

6. The hot stick of claim 5 further comprising an internal caliper measurement jaw having a fixed jaw portion and a movable jaw portion, in which the fixed jaw portion of the internal measurement jaw is fixed to the hot stick stock and the movable jaw portion of the internal caliper measurement jaw is driven by the hot stick driving bar.

7. The hot stick of claim 6 in which the movable jaw portions of the internal and external caliper jaws comprise a single movable jaw piece.

8. The hot stick of claim 6 in which the fixed jaw portions of the internal and external caliper jaws comprise a single fixed jaw piece.

9. The hot stick of claim 2 further comprising a hand grip on the hot stick driving bar.

10. The hot stick of claim 1 in which the dielectric material provides limit of approach protection for high voltage power equipment energized at more than 750 V.

11. The hot stick of claim 1 in which the dimension measuring element is a measuring scale and measuring needle combination.

12. A method comprising:
    remotely measuring a dimension of a component of an electrical power transmission system using the hot stick of claim 1.

13. The method of claim 12 in which the method is carried out by an operator who is outside a safe Limit of Approach while the electrical power transmission system is energized and the measuring end is in a position inside a safe Limit of Approach.

* * * * *